United States Patent
Kogure et al.

[19]

[11] Patent Number: 6,142,427
[45] Date of Patent: Nov. 7, 2000

[54] WIRE-HARNESS MOUNTING STRUCTURE

[75] Inventors: Naoto Kogure; Kenichiro Kawaguchi, both of Shizuoka, Japan

[73] Assignee: Yazaki Corporation, Tokyo, Japan

[21] Appl. No.: 09/303,551

[22] Filed: May 3, 1999

[30] Foreign Application Priority Data

May 11, 1998 [JP] Japan ................................... 10-127333

[51] Int. Cl.⁷ ....................................................... F16L 3/08
[52] U.S. Cl. .............................................................. 248/65
[58] Field of Search .............................. 248/65, 67.7, 73, 248/49, 74.1

[56] References Cited

U.S. PATENT DOCUMENTS

| 5,831,216 | 11/1998 | Hoffmann | 248/73 X |
| 5,839,703 | 11/1998 | Tesar | 248/65 |
| 6,036,145 | 3/2000 | Calabrese et al. | 248/73 X |

FOREIGN PATENT DOCUMENTS

| 3-203122 | 9/1991 | Japan | H01B 7/00 |
| 9-130939 | 5/1997 | Japan | H02G 3/04 |

*Primary Examiner*—Ramon O. Ramirez
*Attorney, Agent, or Firm*—Sughrue, Mion, Zinn, Macpeak & Seas, PLLC

[57] ABSTRACT

A wire-harness mounting structure for mounting wire harnesses of several types with different diameters by making effective use of, for example, a recessed portion between air duct partition walls in an instrument panel of an automobile. By making use of a recessed portion (23) which is located between duct partition walls of an air duct (20) provided in an instrument panel of a vehicle, a harness resilient retaining portion (30) is integrally fixed in the recessed portion (23). A slit (31) is provided in the harness resilient retaining portion (30) in such a manner as to extend from one end side toward the other end side thereof. Each of wire harnesses (40 to 43) of several types with different diameters is resiliently clamped through one-touch fitting in a stepped portion of several stepped portions (32 to 34) of the slit whose slit widths (B1 to B3) become consecutively smaller.

17 Claims, 5 Drawing Sheets

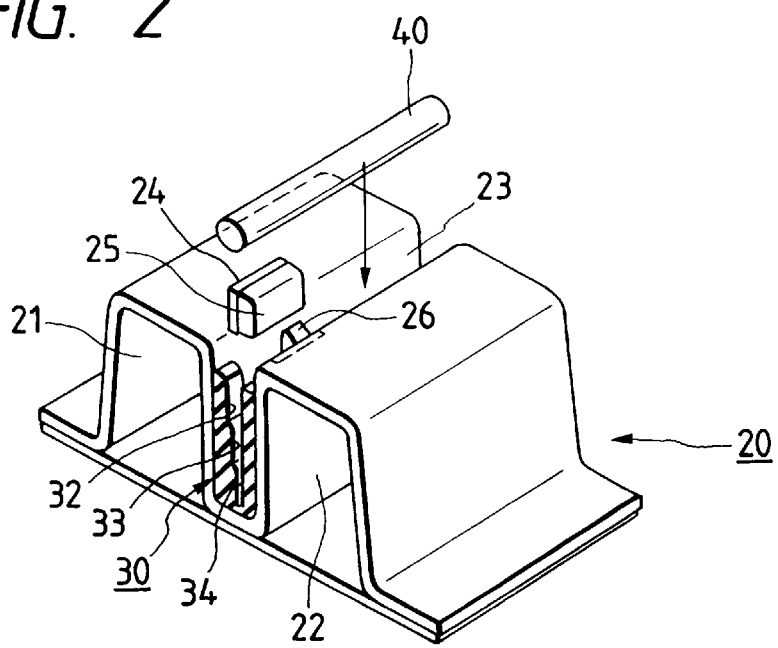
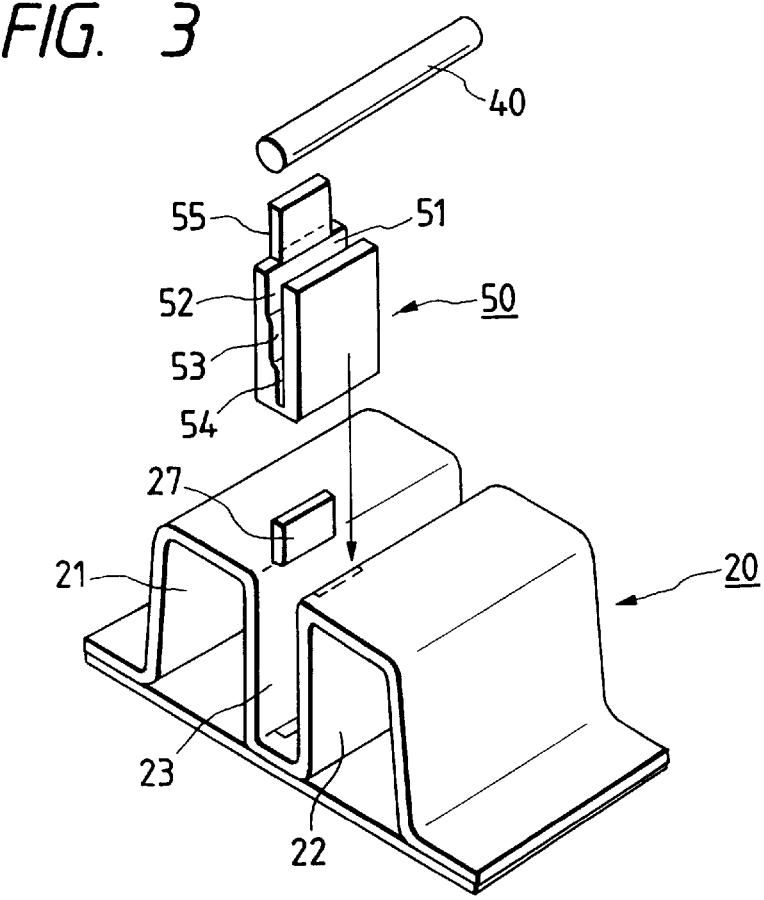

PRIOR ART  FIG. 8
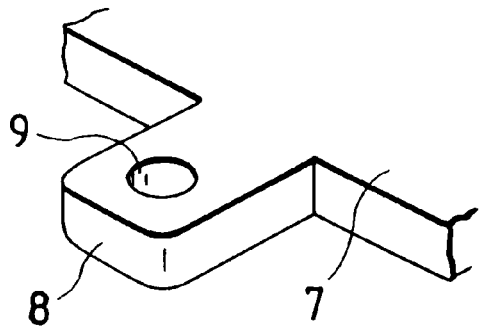
PRIOR ART  FIG. 9
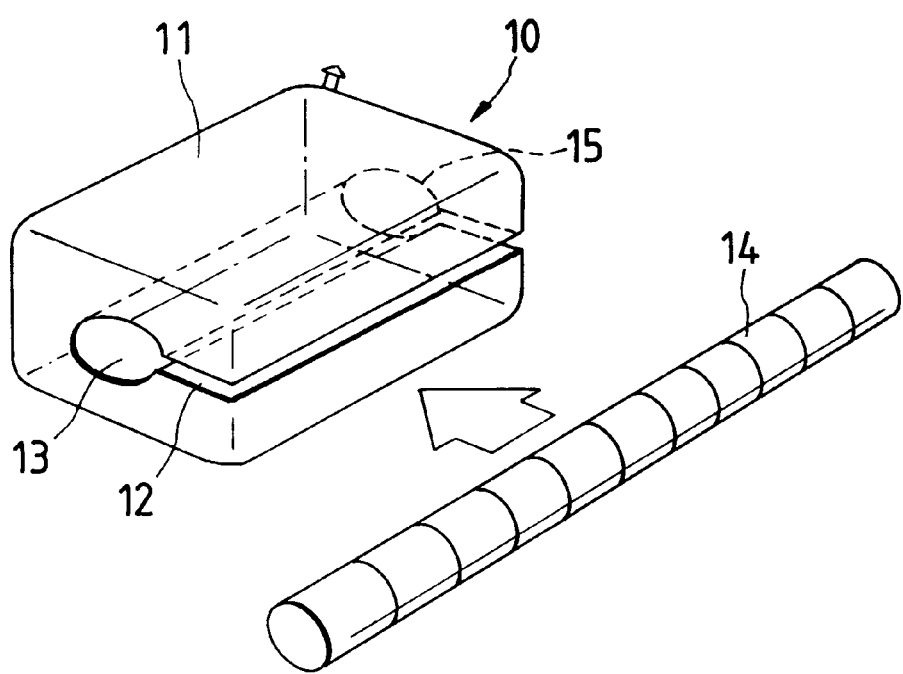

WIRE-HARNESS MOUNTING STRUCTURE

BACKGROUND OF THE INVENTION

1. Field of the Invention

The present invention relates to a structure for mounting a wire harness, which is routed and distributed throughout a vehicle body or the like of an automobile.

2. Discussion of Related Art

A wire harness for connecting electrical systems of an automobile is fixed at required positions in a vehicle body, where the wire harness is routed and distributed, by using retainers such as clips. The wire harness is at least partially accommodated in and protected by an elongated case-shaped protector.

FIGS. 6 and 7 show one example of the structure for fixing the wire harness to the vehicle body by using clips and protectors. As shown in FIG. 6, a wire harness 1 branches off at required positions and is connected to various kinds of mounted electrical apparatuses through electric connectors 2 disposed at leading ends of the branches. Such a wire harness 1 is fixed to the vehicle body in specific positions by using clips 3 and protectors 4.

FIG. 7 shows an example of the mounting structure in which the wire harness 1 is mounted to an instrument panel 5. In appropriate mounting regions, two clips 3 are secured at two adjacent positions on the wire harness 1 by winding an adhesive tape 4 around the wire harness 1 and the clips 3. Two mounting holes 6 are provided in the instrument panel 5 on the vehicle body side corresponding thereto. The clips 3 are inserted into the respective mounting holes 6 in a single motion providing the sensation of resilient clicks, thereby fixing the wire harness 1 to the instrument panel.

In addition, FIG. 8 shows a conventional example illustrating a case where the wire harness 1 is routed and fixed to another portion of the vehicle body, such as a door or its vicinity, other than the aforementioned instrument panel 5. In this case, a flange 8 is provided on the mounting portion of a vehicle body 7, and a mounting hole 9 for receiving the clip 3, shown in FIGS. 6 and 7, is provided in the flange 8. Both the flange 8 and the mounting hole 9 are provided in the vehicle body 7 by die stamping.

FIG. 9 shows a type of protector that is disclosed in Japanese Patent Application Laid-Open No. 130939/1997 and invented by the present applicant. Referring to FIG. 9, this protector 10 is provided with a longitudinal slit 12 extending in the longitudinal direction of a body 11. A bottom end of the slit 12 is formed as an elongated accommodating portion 13 for accommodating a wire harness 14. In addition, a hollow portion 15 for charging air into the interior of the protector body 11 is provided. The wire harness 14 is retained in the accommodating portion 13 by injecting the air into the hollow portion 15 so that the wire harness is held firmly.

With the wire-harness mounting structures shown in the above-described conventional examples, it is necessary to prepare the clips 3 having special configurations by processing them as single units so as to fixedly mount the wire harness 1 to the instrument panel 5 of the vehicle body. Moreover, since the clips 3 are fixed by winding the adhesive tape 4 around the clips 3 and the wire harness 1, the number of elements required for fixation increases, as does the time and degree of difficulty required for the operation. Thus, there is a disadvantage due to the cost increases associated with the large number of elements and the increase in the number of manhours. Furthermore, a number of mounting holes 6 corresponding to the number of the clips 3 must be provided on the instrument panel 5 side with accurate pitches, so that dimensional accuracy is required, leading to a further increase in the overall manufacturing cost.

In addition, in the case where the wire harness is mounted to another portion of the vehicle body 7 other than the instrument panel, if the flanges 8 are specially provided on the vehicle body 7 and the clip mounting holes 9 are additionally provided, as shown in FIG. 8, die stamping becomes complex, and the cost is further increased.

In addition, in the case of the protector 10 shown in FIG. 9, its use is limited to the wire harnesses 14 for retaining wires of substantially specific diameters. Thus, the protector 10 cannot be easily used to retain wire harnesses of different wire diameters. Generally, air ducts are formed in the vehicle body, and if the wire harness can be passed through and fixed in such air ducts, the space can be effectively utilized, resulting in an advantageous arrangement. With the protector 10 of the aforementioned publication, however, it is impossible to place the protector 10 in such an air duct.

Accordingly, a principal object of the present invention is to provide a wire-harness mounting structure which makes it possible to realize low cost by reducing the number of members necessary for mounting the wire harness.

Another object of the present invention is to provide a wire-harness mounting structure which makes it possible to fix the wire harness to the vehicle body of an automobile, by making effective use of, for example, a recessed portion between duct partition walls of an air duct provided in the instrument panel.

A further object of the present invention is to provide a wire-harness mounting structure that is adaptable to mount wire harnesses of different types of wire diameter.

SUMMARY OF THE INVENTION

In the wire-harness mounting structure of the present invention, there is provided a wire-harness mounting member, which can be integrally attached to a recess or a cavity provided in a structural member of the automobile. Specifically, the mounting member has a harness resilient retaining portion having an outer shape which can be received in the recess or the cavity. The mounting member has a slit extending from one side toward another side thereof, the slit At being formed in a wedge-shaped cross section in which the slit width becomes gradually narrower from the one side toward the other side, such that wire harnesses of different diameters can be individually resiliently clamped at an engaging portion of said wedge-shaped slit in a single-touch operation.

Through the above-described configuration, by making use of the recess or cavity in the structural member and by merely integrally joining in advance the harness resilient retaining portion thereto, the wire harness can be clamped and fixed in the slit through a resilient pressure-contacting force. Since clips and protectors used in the conventional structures are not required, it is possible to reduce the number of parts.

Further, according to another aspect of the invention, the wire harness is resiliently clamped in the engaging portion of the wedge-shaped slit by deforming and expanding the engaging portion of said wedge-shaped slit.

Through the above-described configuration, the wire harness can be firmly fixed by a single-touch operation by a component force of the inclined surface of the wedge-shaped slit and the resilient pressure-fitting force. Moreover, since it is sufficient to merely press the wire harness into one end of the wedge-shaped slit where the width is large, there may be slight errors in the dimensional accuracy of the harness resilient retaining portion and the wedge-shaped slit, and particularly high dimensional accuracy is not required.

Further, in the wire-harness mounting structure the wedge-shaped slit has several stepped portions which are formed such that their slit width becomes consecutively smaller from the one side toward the other side. Thus, wire harnesses of several different diameters may be resiliently clamped in an appropriate one of the stepped portions of the slit.

Through the above-described configuration, since several stepped portions are formed in the wedge-shaped slit such that their slit width becomes consecutively smaller, the stepped portions serve as rough targets for allowing the wire harnesses of various diameters to be easily fitted to the respective stepped portions of the slit.

In addition, in the wire-harness mounting structure, the wire harness which is resiliently clamped at the fitting one of said stepped portions of the slit has a wire diameter larger than the slit width of that stepped portion of the slit, and the wire harness is resiliently clamped by resiliently deforming the wedge-shaped and expanding the slit width.

Through the above-described configuration, since the slit width is expanded, the wire harness is resiliently brought into pressure contact, and is firmly clamped and fixed.

In addition, in the wire-harness mounting structure, if the open end of the recess or the cavity faces downward, a retaining cover for closing the lower open end by means of a flap hinge is provided in a recess.

Through the above-described configuration, after the wire harness is pressed from below into the harness resilient retaining portion bonded integrally to the recess facing downward, and is resiliently clamped, the retaining cover is closed from below. Consequently, the wire harness which is resiliently clamped may be further supported from below, to provide greater reliability.

In addition, if the structural member is an instrument panel of a vehicle body, and a portion between dust partition walls of an air duct disposed therein and formed by a defroster duct and a distribution duct which are located adjacent to each other is a recessed portion, the harness resilient retaining portion is integrally joined by being positioned in the recessed portion.

Through the above-described configuration, if the recess in the instrument panel as a specific example is effectively used for the wire harness, it is possible to provide a low-cost wire-harness mounting structure which is easily operated.

Further, in the wire-harness mounting structure if the wire harness is flat cable, the wire harness is capable of being resiliently clamped over its entire length by being positioned in the slit of the harness resilient retaining portion in a widthwise direction of the wire harness.

As described above, it is possible to retain wire harnesses of circular cross sections and of different types with different diameters, and it is sufficient to use the same type of harness resilient retaining portion for wire harnesses that include flat cables.

BRIEF DESCRIPTION OF THE DRAWINGS

FIG. 2 is a perspective view illustrating the first embodiment of the structure for mounting a wire harness shown in FIG. 1;

FIG. 3 is an explode perspective view illustrating the structure for mounting a wire harness in accordance with a second embodiment of the present invention;

FIG. 8 is a perspective view illustrating an example of the case in which the wire harness is fixed to the vehicle body by providing the vehicle body with harness mounting flanges and mounting holes; and FIG. 9 is a perspective view illustrating a protector for a wire harness disclosed in a publication as another conventional example.

DETAILED DESCRIPTION OF THE INVENTION

Figure 1A:
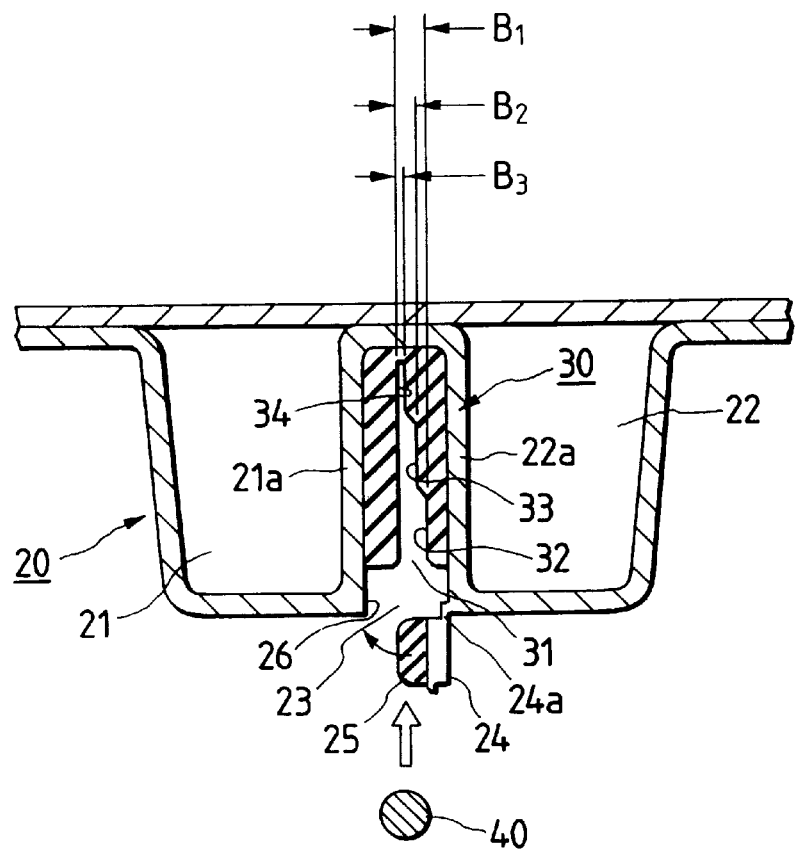
FIG. 1(a) is a perspective view illustrating a first embodiment of the structure for mounting a wire harness in accordance with the present invention which makes use of a cavity in the instrument panel air duct of the vehicle body.

Hereafter, referring to the drawings, a detailed description will be given of the embodiments of the wire-harness mounting structure in accordance with the present invention.

FIGS. 1 and 2 are a front cross-sectional view illustrating the wire-harness mounting structure in accordance with a first embodiment and a perspective view thereof, respectively. In FIG. 1(a) illustrating a front cross section of an essential portion of the structure, if the structural member to which the wire harness is to be mounted is, for example, the vehicle body of an automobile, recesses and cavities are provided in the vehicle body. For example, in the instrument panel of a vehicle compartment, an air duct 20 such as the one shown in the illustrated example is formed. This air duct 20 includes a defroster duct 21 and a distribution duct 22 which are adjacent each other. A recessed portion 23 having a U-shaped section is formed between duct partition walls 21a and 22a of the two ducts. Although the recessed portion 23 is shown facing down in the drawing, this arrangement is only shown for convenience. The present invention is not limited to a particular direction whether it be an upward orientation, or a leftward or rightward orientation.

As is apparent from FIG. 2, harness resilient retaining portions 30 formed of an elastic resin material or the like are integrally bonded and fixed within the recessed portion 23 between the duct partition walls 21a and 22a at a number of locations in the longitudinal direction of the recessed portion 23 by means of bonding or the like.

This harness resilient retaining portion 30 has a longitudinal slit 31 formed therein. One side of the slit 31 is formed in steps, and three stepped portions 32, 33, and 34, for example, are provided. The slit width B1 of the first stepped portion 32 at the entrance of the slit is the largest, the slit width B2 of the second stepped portion 32 in the middle is narrower than the slit width of the first stepped portion 32, and the slit width B3 of the third stepped portion 34 at the bottom of the slit is the smallest.

Further, a retaining cover 24 for closing the recessed portion 23 is formed via a flap hinge 24a at a portion of the air duct 20 where the harness resilient retaining portion 30 is integrally joined. A resilient pressing mat 25 of the same material as that of the harness resilient retaining portion 30 is bonded to the inner surface of the retaining cover 24.

In a case where the air duct 20 is formed of a resin, the retaining cover 24 can be formed integrally therewith, and the flap hinge 24a can be provided with a thin wall thickness. In addition, the retaining cover 24 provided with the flap hinge 24a can be provided on either one of the duct partition walls 21a and 22a. In that case, a retaining projection 26, to which the retaining cover 24 is engaged by undercut fitting or the like with the sensation of a resilient click, is provided on the other one of the duct partition walls 21a and 22a, as shown in FIG. 2.

Next, referring to FIGS. 1(b) to 1(d) and also referring to FIGS. 1(a) and 2, a description will be given of the operation of the wire-harness mounting structure in accordance with the first embodiment having the above-described arrangement.

First, as shown in FIG. 1(a), in mounting a wire harness 40 in the recessed portion 23 between the duct partition walls 21a and 22a of the air duct 20, the retaining cover 24 provided in correspondence with the harness resilient retaining portion 30 is opened. The wire harness 40 is pressed from below in the drawing, for example, into the harness resilient retaining portion 30 located above, along the longitudinal direction of the recessed portion 23.

Figure 1B:
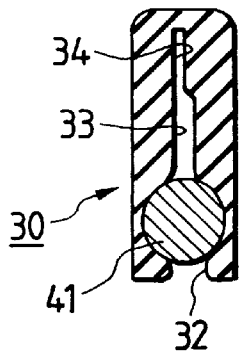
FIGS. 1(b) to 1(d) are cross-sectional views of an essential portion respectively illustrating states in which wire harnesses of various types with different diameters are resiliently clamped in the harness resilient retaining portion.

At this time, if the wire diameter of the wire harness 40 is large, and if it is a wire harness 41 shown in FIG. 1(b), for example, the wire harness 41 is pressed into the first stepped portion 32 at the entrance of the slit 31 of the harness resilient retaining portion 30. The wire diameter of the wire harness 41 is larger than the slit width B1 of the stepped portion 32 of the slit so that the wire harness 41 expands that portion through resilient deformation. Due to the resilient reaction force based on this expansion, the wire harness 41 is resiliently brought into pressure contact with and clamped by the stepped portion 32 of the slit.

To prevent the wire harness from slipping out, the retaining cover 24 is closed, so that the wire harness 41 is further pressed by the resilient pressing mat 25 on the inner side of the cover so as to retain the wire harness 41.

Figure 1C:
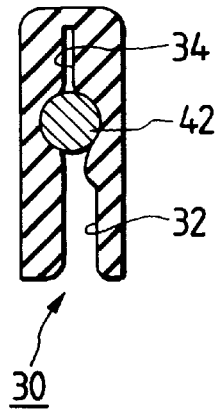

In addition, as shown in FIG. 1(c), in a case where the wire diameter of a wire harness 42 to be mounted is of a medium size as shown in FIG. 1(c), the wire harness 42 is resiliently clamped by the second stepped portion 33 of the slit in the middle stage of the slit 31 of the harness resilient retaining portion 30. In this case as well, as the slit width B2 of the stepped portion 33 of the slit is similarly expanded, the wire harness 42 is resiliently brought into pressure contact and is clamped.

Figure 1D:
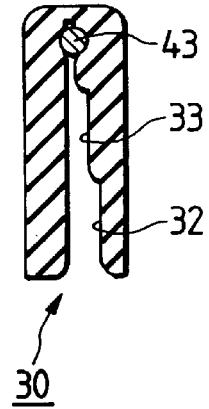

Further, in a case where the wire diameter of a wire harness 43 to be mounted is of a small size as shown in FIG. 1(d), the wire harness 43 is resiliently clamped by the innermost stepped portion 34 of the harness resilient retaining pottion 30. As the slit width B3 of the stepped portion 34 of the slit is similarly expanded, the wire harness 43 is resiliently brought into pressure contact and is clamped.

As described above, in accordance with this embodiment, even in cases where the wire diameter of the wire harness 40 is different, the wire harness 40 can be resiliently held in the harness resilient retaining portion 30.

Next, FIG. 3 is a perspective view illustrating a second embodiment in accordance with the present invention. Identical members or members of the same type as those of the above-described first embodiment are denoted by the same reference numerals.

In this case, the harness retaining member is not provided in the recessed portion 23 of the air duct 20. Instead, it is separately molded as a harness resilient retaining portion 50. In this harness resilient retaining portion 50 as well, first to third stepped portions 52, 53, and 54 of the slit, for example, are respectively formed in a stepped manner in a longitudinal slit 51 in the order of the large-, medium-, and small-diameter slits.

The retaining cover can be provided integrally as a retaining cover 55 on the resilient retaining portion 50 side in the vicinity of the entrance of the slit so that it can be opened and closed. Alternatively, a retaining cover 27 may be provided in the recessed portion 23 on the air duct 20 side on either one of the duct partition walls 21a and 22a or on both sides thereof.

In the above-described first and second embodiments, the wire harnesses 40 to 43 which are cables having circular cross sections are illustrated as objects to be mounted. The present invention is not limited to such cables with circular cross sections. Wire harnesses which are cables having flat cross sections can also be resiliently clamped and fixed by the harness resilient retaining portion 30 or the harness resilient retaining portion 50.

Figure 4:
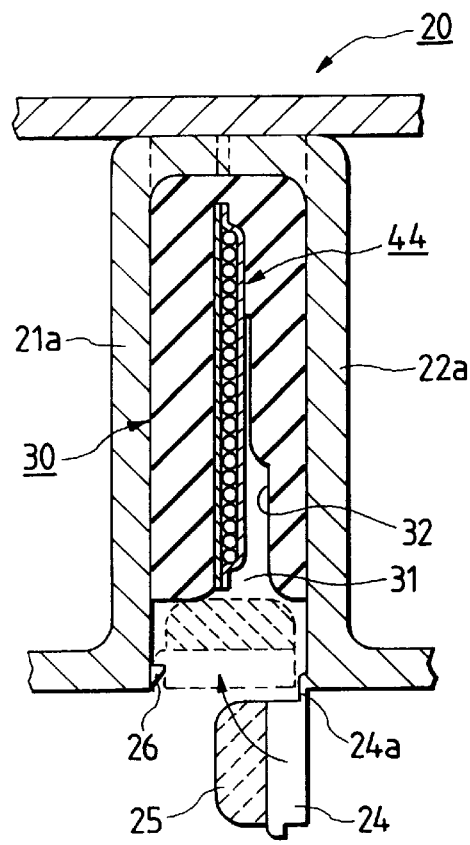
FIG. 4 is a cross-sectional view of an essential portion illustrating a form in which a wire harness that is a cable having a flat cross section is resiliently clamped in the first embodiment shown in FIG. 1 and in the second embodiment shown in FIG. 3.
Figure 5:
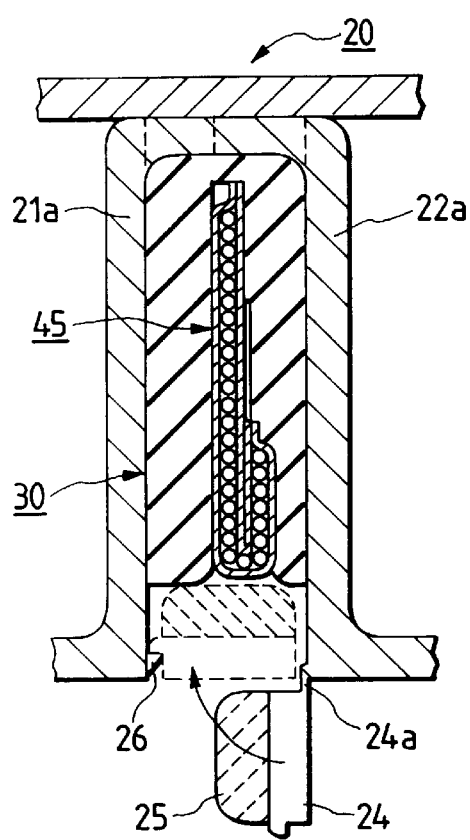
FIG. 5 is a cross-sectional view of the essential portion illustrating a form in which another wire harness that is a cable having a flat cross section is resiliently clamped in the first embodiment shown in FIG. 1 and in the second embodiment shown in FIG. 3.
Figure 6:
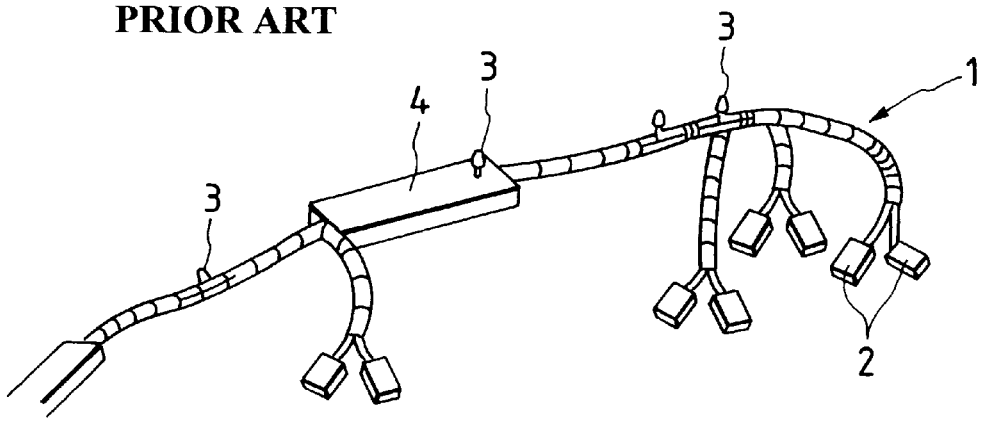
FIG. 6 is a perspective view illustrating a conventional structure for mounting a wire harness using clips and protectors.
Figure 7:
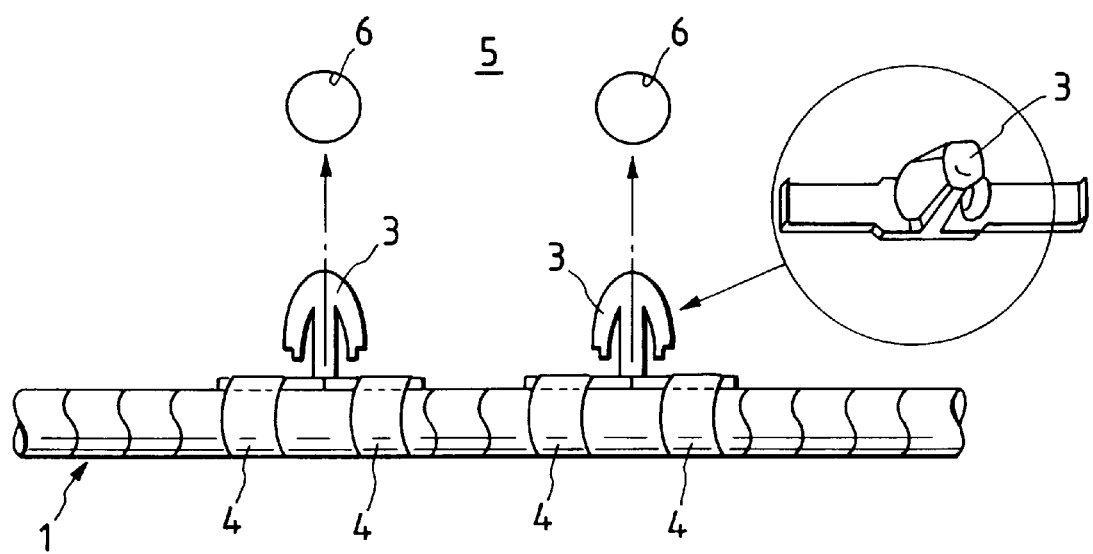
FIG. 7 is a partly enlarged side elevational view illustrating a state in which the wire harness is fixed in the mounting holes provided in the vehicle body by means of the clips in the conventional example shown in FIG. 6.

Namely, as shown in FIG. 4, in the case where a wire harness 44 is a flat cable, the wire harness 44 can be resiliently clamped and fixed over the entire depth of the slit 31 of the harness resilient retaining portion 30. Further, as shown in FIG. 5, in a case where a wire harness 45 which is similarly a flat cable that has a width longer than the entire depth of the slit 31 of the harness resilient retaining portion 30, the wire harness 45 can be appropriately folded in two and can be resiliently clamped and fixed in the slit 31.

It should be noted that, in the first and second embodiments, the slit 31 of the harness resilient retaining portion 30 has been illustrated as being one in which stepped portions, having consecutively narrower slit widths B1 to B3, are formed on one side thereof. However, in attaining the technical concept of the present invention, the slit is not confined to the slit 31 in which such stepped portions are formed. The slit may be formed as one having a wedge-shaped cross section formed by a tapered surface in which the slit width becomes gradually smaller.

In this case as well, as each of the wire harnesses 40 to 43 is pressed into an engaging portion of such a wedge-shaped slit, that portion is resiliently deformed and expanded. Consequently, each of the wire harnesses 40 to 43 can be resiliently brought into pressure contact and can be clamped and fixed.

As described above, since the harness retaining portion has a degree of freedom, the harness retaining portion is able to absorb an assembly error. In addition, the vibration of the harness at the fixed portion is suppressed, so that the structure for mounting a wire harness in accordance with the present invention also functions to prevent abnormal noise.

As described above, in the structure for mounting a wire harness in accordance with the present invention, it is possible to make use of the recess between duct partition walls of an air duct or the like in the vehicle body of an automobile. As the harness resilient retaining portion having a wedge-shaped slit is merely provided by being integrally joined to the recessed portion, other mounting members such as clips are unnecessary, and wire harnesses of several types with different diameters can be resiliently clamped by being easily pressed into the engaging portion of the gradually narrowed wedge-shaped slit in a single-touch operation. Consequently, the number of parts can be reduced as compared with the conventional examples, and since very high processing accuracy is not required as the dimensional accuracy of the mounting portions, it is effective to reduce the overall manufacturing cost including the parts cost and the assembly cost.

What is claimed is:

1. A wire harness mounting member, comprising:

a resilient unitary body, integrally formed of a common material, having a base portion and a pair of side legs extending from opposite sides of said base portion to define a slit therebetween, with said base portion located at a bottom end of said slit, wherein a width of said slit gradually decreases from an open end of said slit to said bottom end such that said slit can receive and retain wire harnesses having different widths.

2. The wire harness of claim 1, wherein an inside surface of at least one of said side legs is stepped, such that the width of said slit decreases in a step-wise manner from said open end to said bottom end.

3. The wire harness of claim 2, further comprising a cover attached to said resilient unitary body for covering said open end of said slit.

4. The wire harness of claim 3, wherein said cover is pivotally attached to said resilient unitary body.

5. The wire harness of claim 2, wherein said slit is dimensioned to receive wire harnesses having a circular cross-section.

6. The wire harness of claim 2, wherein said slit is dimensioned to receive wire harnesses having a substantially planar cross-section.

7. The wire harness of claim 1 wherein said resilient member is adapted to be secured in a recess provided between air ducts in a vehicle.

8. The wire harness of claim 1, wherein said slit is dimensioned to receive wire harnesses having a circular cross-section.

9. A wire harness mounting arrangement for mounting a wire harness in a recess defined by a pair of ducts in an automobile, comprising:

a resilient unitary body, integrally formed of a common material, having a base portion and a pair of side legs extending from opposite sides of said base portion to define a slit therebetween with said base portion located at a bottom end of said slit, wherein a width of said slit gradually decreases from said open end to said bottom end such that said slit can receive and retain wire harnesses having different widths; and a fastener for fastening said resilient unitary body in said recess with an open end of the slit being exposed to receive said wire harnesses.

10. The wire harness of claim 9, wherein an inside surface of at least one of said side legs is stepped, such that the width of said slit decreases in a step-wise manner from said open end to said bottom end so as to define a plurality of stepped gaps.

11. The wire harness of claim 10, further comprising a cover attached to said resilient unitary body for covering said open end of said slit.

12. The wire harness of claim 11, wherein said cover is pivotally attached to said resilient unitary body.

13. The wire harness of claim 10, wherein said slit is dimensioned to receive wire harnesses having a circular cross-section.

14. The wire harness of claim 10, wherein said slit is dimensioned to receive wire harnesses having a substantially planar cross-section corresponding to a flat cable.

15. The wire harness of claim 14, wherein the width of said stepped gaps is greater than the width of said flat cable, thereby requiring a portion of the flat cable to be folded between said stepped gaps.

16. The wire harness of claim 14, therein a width of said stepped gaps is less than a width of said flat cable.

17. The wire harness of claim 9, wherein said slit is dimensioned to receive wire harnesses having a circular cross-section.

* * * * *